United States Patent [19]

Müller et al.

[11] Patent Number: 4,537,596
[45] Date of Patent: Aug. 27, 1985

[54] POLYETHERESTERS, THEIR PREPARATION, AND THEIR USE FOR TREATING TEXTILES

[75] Inventors: Hanns P. Müller, Odenthal; Karl Schäfer, Leverkusen, both of Fed. Rep. of Germany

[73] Assignee: Bayer Aktiengesellschaft, Leverkusen, Fed. Rep. of Germany

[21] Appl. No.: 651,003

[22] Filed: Sep. 14, 1984

[30] Foreign Application Priority Data

Sep. 26, 1983 [DE] Fed. Rep. of Germany ....... 3334798

[51] Int. Cl.³ .................... D06M 9/00; C08G 63/66
[52] U.S. Cl. .................................. 8/115.6; 8/115.7; 8/127.5; 8/128 R; 8/133; 8/116.1; 528/301; 528/302; 528/308
[58] Field of Search ............. 528/272, 308, 301, 302; 524/601; 8/115.6, 116 R, 127.5, 128, 133, 115.7

[56] References Cited

U.S. PATENT DOCUMENTS

| | | | |
|---|---|---|---|
| 3,583,878 | 6/1971 | Ragep et al. | 427/175 |
| 3,712,873 | 1/1973 | Zenk | 524/549 |
| 3,959,230 | 5/1976 | Hays | 524/605 |
| 3,962,152 | 6/1976 | Nicol et al. | 252/551 |
| 3,981,833 | 9/1976 | Lark | 524/47 |
| 4,132,680 | 1/1979 | Nicol | 8/137 |
| 4,210,417 | 7/1980 | McClain et al. | 8/115.6 |
| 4,411,831 | 10/1983 | Robinson et al. | 252/554 |

FOREIGN PATENT DOCUMENTS 1092435 11/1967 United Kingdom .

*Primary Examiner*—A. Lionel Clingman
*Attorney, Agent, or Firm*—Sprung Horn Kramer & Woods

[57] ABSTRACT

Water-soluble or water-dispersible segmented polyetheresters having a predominantly linear molecular structure and containing (a) 3-45% by weight of terephthalate groups of the formula

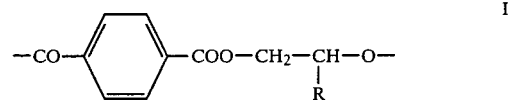

wherein
R denotes hydrogen or methyl, (b) 0.4-6% by weight of terephthalate groups of the formula

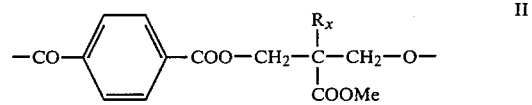

wherein
$R_x$ denotes hydrogen or $C_1$-$C_4$-alkyl and
Me denotes an alkali metal or ammonium ion, and (c) 49-96.6% by weight of terminal polyalkylene glycol groups, all the weights being relative to that of the polyetherester, are used for finishing synthetic fibre textile material.

8 Claims, No Drawings

POLYETHERESTERS, THEIR PREPARATION, AND THEIR USE FOR TREATING TEXTILES

The invention relates to water-soluble or waterdispersible segmented polyetheresters having a predominantly linear molecular structure and containing (a) 3–45% by weight of terephthalate groups of the formula

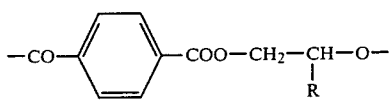

wherein
R denotes hydrogen or methyl, (b) 0.4–6% by weight of terephthalate groups of the formula

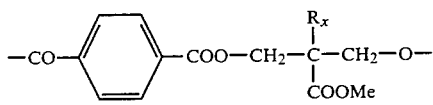

wherein
$R_x$ denotes hydrogen or $C_1$–$C_4$-alkyl and
Me denotes an alkali metal or ammonium ion, and (c) 49–96.6% by weight of terminal polyalkylene glycol groups, all the weights being relative to that of the polyetherester,
to their preparation and to their use for finishing textile materials made of synthetic fibres, in particular polyester fibres and mixtures of synthetic fibres with cellulosic fibres or keratin-containing fibres.

The average molecular weight of the polyetheresters is of the order of 500–11,000, preferably 1,000–6,000.

In (a) a proportion, for example up to 25 mole %, of the alkyleneoxy group can be replaced by residues of other diols, preferably $C_3$–$C_8$-glycols. Similarly in (b) a proportion, for example up to 50 mole %, of the COOMe group can be replaced by a sulphonate, cyano, carboxylic acid ester or carboxamide group.

In the abovementioned segments of preferred polyetheresters,
R represents hydrogen,
Me represents Li, Na, K or

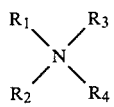

and
$R_1$, $R_2$, $R_3$ and $R_4$ each represent hydrogen or $C_1C_{20}$-alkyl which can be substituted by OH or $NH_2$, and segment (c) of such preferred polyetheresters is an ethylene or propylene glycol ether or a mixed ethylene/propylene glycol ether of the formula

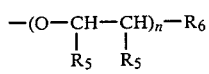

wherein
$R_5$ represents hydrogen and/or methyl,
$R_6$ represents $C_1$–$C_{20}$-alkoxy or di-$C_1$–$C_{20}$-alkylamino and
n represents 10–220, in particular 15–120.

Of these polyetheresters, preference in turn goes to those which contain
10–20% by weight of (a),
1–3% by weight of (b), and
70–89% by weight of (c),
and component (c) is a polyethylene glycol monoalkyl ether or a mixed polyethylene/propylene glycol monoalkyl ether.

The polyetheresters are prepared using methods known per se. They are preferably prepared by adopting the prepolymer principle, i.e. by reacting excess ethylene glycol and a salt of the acid of the formula

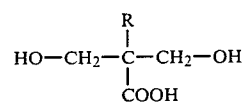

with dimethyl terephthalate in the presence of esterification catalysts to give prepolymers having terminal OH groups, and subsequently condensing these with monofunctional polyalkylene glycol having a hydroxyl group.

Ethylene glycol and said acid (IV) can be reacted with the terephthalate either simultaneously or in succession. The quantities in this reaction are so chosen that $0.1 \times 10^{-4}$ to 0.21 carboxyl groups from (IV) are present per hydroxyl group of the glycol.

A proportion of the alkylene glycol in this reaction, for example up to 25 mole %, can be replaced by other diols, such as propane-1,3-diol, butane-1,4-diol, butane-1,3-diol, butane-1,2-diol, neopentylglycol, hexane-1,6-diol, 2-ethylhexane-1,3-diol and/or mixtures thereof.

Preferred acids (IV) are dimethylolacetic acid, $\alpha,\alpha$-dimethylol propionic acid and $\alpha,\alpha$-dimethylol-n-valeric acid, in particular $\alpha,\alpha$-dimethylolpropionic acid.

A proportion of acids (IV) in this reaction, for example up to 50 mole %, can be replaced by compounds which have an $SO_3H$, CN, $CONHR_7$ or $CON(R_7)_2$ group (where $R_7=C_1$–$C_4$-alkyl) in place of the carboxylic acid group.

The prepolymers are generally prepared at a temperature of 140°–240° C., preferably 160°–210° C.

The catalysts used for this reaction are compounds known as catalysts for polycondensations (R. W. Wilfong, J. Polym. Sci. 54, 385 (1961)).

The catalysts include zinc, manganese, cobalt, antimony, germanium, titanium and tin compounds, such as tin(II) chloride, antimony trioxide, antimony trichloride, antimony triacetate, germanium dioxide, germanium tetrachloride, and tetraalkyltitanic acid esters. Manganese acetate is preferred.

The formation of the prepolymer is followed by the reaction with the monofunctional polyethers.

The monofunctional polyalkylene glycol derivatives can be prepared by polymerising epoxides such as ethylene oxide, propylene oxide, butylene oxide, tetrahydrofuran, styrene oxide or epichlorohydrin in the presence of Lewis catalysts such as $BF_3$, if desired mixed or in succession, onto starting components having reactive hydrogen atoms. The starting components can be, for example, alcohols and amines such as methanol, ethanol, propanol, isopropanol, butanol, butylglycol or diethylene glycol monobutyl ether, dibutylamine or dimethylethanolamine. In many instances preferred polyethers are those which carry mainly primary OH groups.

The polyethers preferably have an average molecular weight of 400–10,000, preferably 700–5,000.

The prepolymers are reacted with these polyethers in the melt, preferably under reduced pressure in vacuo (0.1–40 mmHg) at temperatures of 140°–280° C., preferably 160°–260° C. When the calculated excess amount of low molecular weight diol has been distilled off, the melt is cooled with stirring to 100°–110° C., and the segmented polyetheresters are obtained out of the melt via a cooling roll in granulated form, or the hot melt at 100°–110° C. is metered with stirring into hot water at 60° C. This gives aqueous dispersions. They have a long shelf-life and are stable in treatment baths.

The new polyetheresters are very light-resistant compounds. They are used for finishing textile material made of synthetic fibres or keratin-containing fibres. Of synthetic fibres, the treatment is preferably applied to polyester fibres, such as polyethylene terephthalate fibres.

The polyetheresters are applied from the aqueous liquor using the exhaust method, by dipping and squeezing the textile material, or by spraying. The exhaust method is preferred. It comprises treating textiles at a liquor ratio of 10:1 to 50:1. The textile material which has been treated with the aqueous liquors is conventionally dewatered by whizzing or squeezing, is predried at 100°–120° C., and is subsequently advantageously heated at 130°–190° C. for 180-20 seconds. However, depending on the nature of the goods the dewatered textile material can also be dried at 140°–190° C. for 180-30 seconds without intermediate predrying.

The amount of polyetherester put into the treatment bath can vary within wide limits, according to the desired effect. It is, for example, of the order of 0.2–3% and is preferably 0.5–1% on weight of fibre.

The finishing process can take place before, after or together with the dyeing process or the treatment with fluorescent brighteners.

The polyetheresters can also be applied together with a crease-resist product or with agents for rendering keratin-containing fibre materials non-felting, for example with polyurethane prepolymers having blocked isocyanate groups.

By means of the new polyetheresters the textile material can be given a permanent easy-care finish. This finish considerably improves the wear properties of the textiles: their hydrophilicity is increased, their soil-repelling and antistatic properties are improved, and they feel softer.

Agents based on certain polyetheresters without lateral aliphatically bonded carboxylate groups and used for conferring easy-care and increased wear comfort properties on textile material made of synthetic fibres are already known.

They are obtained, for example, from spinnable polyethylene terephthalate by reaction with polyethylene glycol or the monoalkyl ethers of polyethylene glycol and are described in U.S. Patent Specifications 3,583,878, 3,712,873 and 4,210,417.

The following compounds are used as monofunctional polyethers in the Examples:

polyether A: addition product of butanol and ethylene oxide; average molecular weight: 2,000; OH value: 28;

polyether B: addition product of butanol and ethylene oxide; average molecular weight: 1,000; OH value: 56;

polyether C: addition product of butanol and ethylene/propylene oxide in a ratio of 1:1; average molecular weight: 2,620; OH value: 21.4.

EXAMPLE 1

In a 2-liter 3-necked flask (vessel 1) which is equipped with internal thermometer, stirrer, esterification attachment and distillation bridge, 181.4 g (2.925 moles) of ethylene glycol, 10.05 g (0.075 mole) of dimethylolpropionic acid and 4.0 g (0.07125 mole) of KOH pellets are dissolved together at room temperature under nitrogen in the course of half an hour, during which the temperature of the batch rises slightly. 194 g (1 mole) of dimethyl terephthalate and 0.38 g of manganese(II) acetate$\times 4$ $H_2O$ are then added. The mixture is heated with stirring and a slow stream of nitrogen to 140° C., and turns into a clear melt. To obtain transesterification the batch is then raised from 160° to 180° C. in the course of 3 hours and is then heated up to an internal temperature of 210° C. in the course of a further hour, during which 63 to 66 g of methanol (calculated 64 g of $CH_3$—OH), mixed with a little ethylene glycol, are distilled off. When the calculated amount of methanol has been distilled off, the batch is cooled down with stirring under nitrogen to 120° C. At this temperature 1,000 g (0.5 mole) of polyether A are added in the form of a melt (100°–120° C.), the apparatus is put under water jet vacuum, and the batch is then gradually raised to an internal temperature of 260° C. in the course of 1.5 hours, during which ethylene glycol, initially that freely present and then that formed by reaction, is distilled off continuously. When 115–120 g (calculated 124 g) of ethylene glycol have been distilled off and an internal temperature of 260° C. has been reached, the heating is switched off, and the batch is cooled down with stirring under nitrogen to 100°–110° C.

In a further, 10-liter 3-necked flask (vessel 2) 5,083 g of distilled water are heated with stirring under nitrogen to 60° C. The hot melt at 100°–110° C. in vessel 1 is then slowly metered with stirring into the hot water at 60° C. in vessel 2. After all the melt has been added the resulting aqueous dispersion is stirred for a further hour without applied heating. The content of the vessel is discharged at room temperature through a coarse frit or filter cloth. This produces a white dispersion with a 20% solids content which has a viscosity $\eta$ 25° C. of 48 mPas and a long shelf-life.

EXAMPLE 2

In a 1-liter 3-necked flask (vessel 1) which is equipped with internal thermometer, stirrer, esterification attachment and distillation bridge, 68.2 g (1.1 moles) of ethylene glycol, 13.4 g (0.1 mole) of dimethylolpropionic acid and 5.33 g (0.095 mole) of KOH pellets are dissolved together at room temperature under nitrogen in the course of half an hour. 77.4 g (0.4 mole) of dimethyl terephthalate and 0.15 g of manganese(II) acetate$\times 4$-$H_2O$ are then added. The mixture is heated with stirring and a slow stream of nitrogen to 140° C., and and turns into a clear melt. To obtain transesterification the batch is then raised from 160° to an internal temperature of 210° C. in the course of 4 hours, during which 25.7 g of methanol (calculated 25.6 g of $CH_3$—OH), mixed with a little ethylene glycol, are distilled off. When the calculated amount of methanol has been distilled off, the batch is cooled down with stirring under nitrogen to 120° C. At this temperature, 400 g (0.2 mole) of polyether A are added in the form of a melt (100°–120° C.), the apparatus is put under water jet vacuum, and the batch is then gradually raised to an internal temperature of 260° C. in the course of 1.5 hours, during which ethylene glycol, initially that freely present and then that formed by reaction, is distilled off continuously. When 42.5 g (calculated 49.6 g) of ethylene glycol have been distilled off and an internal temperature of 260° C. has been reached, the heating is switched off, and the batch is cooled down with stirring under nitrogen to 100°–110° C. 9.31 g (0.095 mole) of 50% strength sulphuric acid and 26.89 g (0.095 mole) of N-methylstearylamine are then added.

In a further, 6-liter 3-necked flask (vessel 2) 2,970 g of distilled water are heated with stirring under nitrogen to 60° C. The hot melt at 100°–110° C. in vessel 1 is then slowly metered with stirring into the hot water at 60° C. in vessel 2. After all the melt has been added the resulting aqueous dispersion is stirred for a further hour without applied heating. This produces a white dispersion with a 15% solids content which has a viscosity $\eta$ 25° C. of 16.1 mPas and a long shelf-life.

EXAMPLE 3

In a 1-liter 3-necked flask (vessel 1) which is equipped with internal thermometer, stirrer, esterification attachment and distillation bridge, 68.2 g (1.1 moles) of ethylene glycol, 13.4 g (0.1 mole) of dimethylolpropionic acid and 5.33 g (0.095 mole) of KOH pellets are dissolved together at room temperature under nitrogen in the course of half an hour 77.4 g (0.4 mole) of dimethyl terephthalate and 0.15 g of manganese(II) acetate×4H$_2$O are then added. The mixture is heated with stirring and a slow stream of nitrogen to 140° C., and turns into a clear melt. To obtain transesterification the batch is then raised from 160 to an internal temperature of 210° C. in the course of 4 hours, during which 27.3 g of methanol (calculated 25.6 g of CH$_3$—OH), mixed with a little ethylene glycol, are distilled off. When the calculated amount of methanol has been distilled off, the batch is cooled down with stirring under nitrogen to 120° C. At this temperature 400 g (0.2 mole) of polyether A are added in the form of a melt (100°–120° C.), the apparatus is put under water jet vacuum, and the batch is then gradually raised to an internal temperature of 260° C. in the course of 1.5 hours, during which ethylene glycol, initially that freely present and then that formed by reaction, is distilled off continuously. When 46.7 g (calculated 49.6 g) of ethylene glycol have been distilled off and an internal temperature of 260° C. has been reached, the heating is switched off, and the batch is cooled down with stirring under nitrogen to 140° C. The hot melt is poured onto a Teflon tray, where it solidifies into a wax-like solid having a melting point of 50°–60° C. The solid product is broken up into pieces and is immediately usable in this form as a textile-finishing agent or, as in Example 1, it is turned into an aqueous dispersion.

EXAMPLE 4

In a 1-liter. 3-necked flask (vessel 1) which is equipped with internal thermometer, stirrer, esterification attachment and distillation bridge, 72.54 g (1.17 moles) of ethylene glycol, 2.01 g (0.015 mole) of dimethylolpropionic acid and 0.8 g (0.01425 mole) of KOH pellets are dissolved together at room temperature under nitrogen in the course of half an hour. 6.45 g (0.015 mole) of a propoxylated adduct of 2-butene-1,4-diol and NaHSO$_3$ (molecular weight 430) and 77.4 g (0.4 mole) of dimethyl terephthalate and 0.15 g of manganese(II) acetate×4H$_2$O are then added. The mixture is heated with stirring under a slow stream of nitrogen to 140° C., and turns into a clear melt. To obtain transesterification the batch is then raised from 160° to 180° C. in the course of 3 hours and is then heated up to an internal temperature of 220° C. in the course of a further hour, during which 24 g of methanol (calculated 25.6 g of CH$_3$—OH), mixed with a little ethylene glycol, are distilled off. When the calculated amount of methanol has been distilled off, the batch is cooled down with stirring under nitrogen to 120° C. At this temperature 400 g (0.2 mole) of polyether A are added in the form of a melt (100°–120° C.), the apparatus is put under a water jet vacuum, and the batch is then gradually heated to an internal temperature of 260° C. in the course of 1.5 hours, during which ethylene glycol, initially that freely present and then that formed by reaction, is distilled off continuously. When 46.5 g (calculated 49.6 g) of ethylene glycol have been distilled off and an internal temperature of 260° C. has been reached the heating is switched off and the batch is cooled down with stirring under nitrogen to 100°–110° C.

In a further, 6-liter 3-necked flask (vessel 2) 2,740 g of distilled water are heated with stirring under nitrogen to 60° C. The hot melt at 100°–110° C. in vessel 1 is then slowly metered with stirring into the hot water at 60° C. in vessel 2. After all the melt has been added the resulting aqueous dispersion is stirred for a further hour without applied heating. The content of the vessel is discharged at room temperature through a coarse frit or filter cloth. This produces a white dispersion with a 15% solids content which has a viscosity $\eta$ 25° C. of 20.3 mPas and a long shelf-life.

EXAMPLE 5

In a 1-liter 3-necked flask (vessel 1) which is equipped with internal thermometer, stirrer, esterification attachment and distillation bridge, 71.92 g (1.16 moles) of ethylene glycol, 5.26 g (0.02 mole) of a fatty alcohol mixture comprising $C_{14}H_{29}OH$ to $C_{22}H_{45}OH$ (2% $C_{14}$, about 51% $C_{16}$, about 28% $C_{18}$, about 14% $C_{20}$ and 3% $C_{22}$), 4.02 g (0.03 mole) of dimethylolpropionic acid and 1.6 g (0.0785 mole) of KOH pellets are dissolved together at room temperature under nitrogen in the course of half an hour. 77.4 g (0.4 mole) of dimethyl terephthalate and 0.15 g of manganese(II) acetate×4 H$_2$O are then added. The mixture is heated with stirring and a slow stream of nitrogen to 140° C., and turns into a clear melt. To obtain transesterification the batch is then raised from 160° to 180° C. in the course of 3 hours and is then heated up to an internal temperature of 210° C. in the course of a further hour, during which 25.2 g of methanol (calculated 25.6 g of CH$_3$—OH), mixed with a little ethylene glycol, are distilled off. When the calculated amount of methanol has been distilled off, the batch is cooled down with stirring under nitrogen to 120° C. At this temperature 400 g (0.2 mole) of polyether A are added in the form of a melt (100°–120° C.), the apparatus is put under water jet vacuum, and the batch is then gradually raised to an internal temperature of 260° C. in the course of 1.5 hours, during which ethylene glycol, initially that freely present and then that formed by reaction, is distilled off continuously. When 46 g (calculated 49.6 g) of ethylene glycol have been distilled off and an internal temperature of 260° C. has been reached, the heating is switched off, and the batch is cooled down with stirring under nitrogen to 140° C.

The pale yellowish melt is then poured onto a Teflon tray, where it solidifies into a wax-like solid having a melting point of 50°–60° C.

30 g of the solid product thus obtained are melted at 80°–90° C., and 160 g of water are metered into the melt. This produces an aqueous dispersion with a 15% solids content.

EXAMPLE 6

In a 1-liter 3-necked flask (vessel 1) which is equipped with internal thermometer, stirrer, esterification attachment and distillation bridge, 181.4 g (2.925 moles) of ethylene glycol, 10.05 g (0.075 mole) of dimethylolpropionic acid and 4.0 g (0.07125 mole) of KOH pellets are dissolved together at room temperature under nitrogen in the course of half an hour, during which the temperature of the batch rises slightly. 194 g (1 mole) of dimethyl terephthalate and 0.38 g of manganese(II) acetate$\times 4H_2O$ are then added. The mixture is heated with stirring and a slow stream of nitrogen to 140° C., and turns into a clear melt. To obtain transesterification the batch is then raised from 160° to 180° C. in the course of 3 hours and is then heated up to an internal temperature of 210° C. in the course of a further hour, during which 63 to 66 g of methanol (calculated 64 g of $CH_3$—OH), mixed with a little ethylene glycol, are distilled off. When the calculated amount of methanol has been distilled off, the batch is cooled down with stirring under nitrogen to 120° C. At this temperature 500 g (0.5 mole) of polyether B are added in the form of a melt (100°–120° C.), the apparatus is put under water jet vacuum, and the batch is then gradually raised to an internal temperature of 260° C. in the course of 1.5 hours, during which ethylene glycol, initially that freely present and then that formed by reaction, is distilled off continuously. When 115–120 g (calculated 124 g) of ethylene glycol have been distilled off and an internal temperature of 260° C. has been reached, the heating is switched off, and the batch is cooled down with stirring under nitrogen to 100°–110° C.

In a further, 6-liter 3-necked flask (vessel 2) 3,977 g of distilled water are heated with stirring under nitrogen to 60° C. The hot melt at 100°–110° C. in vessel 1 is then slowly metered with stirring into the hot water at 60° C. in vessel 2. After all the melt has been added the resulting aqueous dispersion is stirred for a further hour without applied heating. The content of the vessel is discharged at room temperature through a coarse frit or filter cloth. This produces a white dispersion with a 15% solids content which has a viscosity $\eta$ 25° C. of 30 mPas and a long shelf-life.

EXAMPLE 7

In a 2-liter 3-necked flask (vessel 1) which is equipped with internal thermometer, stirrer, esterification attachment and distillation bridge, 181.4 g (2.925 moles) of ethylene glycol, 10.05 g (0.075 mole) of dimethylolpropionic acid and 4.0 g (0.07125 mole) of KOH pellets are dissolved together at room temperature under nitrogen in the course of half an hour, during which the temperature of the batch rises slightly. 194 g (1 mole) of dimethyl terephthalate and 0.38 g of manganese(II) acetate$\times 4$ $H_2O$ are then added. The mixture is heated with stirring and a slow stream of nitrogen to 140° C., and turns into a clear melt. To obtain transesterification the batch is then raised from 160° to 180° C. in the course of 3 hours and is then heated up to an internal temperature of 210° C. in the course of a further hour, during which 63 to 66 g of methanol (calculated 64 g of $CH_3$—OH), mixed with a little ethylene glycol, are distilled off. When the calculated amount of methanol has been distilled off, the batch is cooled down with stirring under nitrogen to 120° C. At this temperature 1,310 g (0.5 mole) of hot polyether C at 100° C. are added, the apparatus is put under water jet vacuum, and the batch is then gradually raised to an internal temperature of 260° C. in the course of 1.5 hours, during which ethylene glycol, initially that freely present and then that formed by reaction, is distilled off continuously. When 115–120 g (calculated 124 g) of ethylene glycol have been distilled off and an internal temperature of 260° C. has been reached, the heating is switched off, and the batch is cooled down with stirring under nitrogen to 60°–80° C.

In a further, 10-liter 3-necked flask (vessel 2) 6,047 g of distilled water are heated with stirring under nitrogen to 60° C. The hot melt at 60°–80° C. in vessel 1 is then slowly metered with stirring into the hot water at 60° C. in vessel 2. After all the melt has been added the resulting aqueous dispersion is stirred for a further hour without applied heating. The content of the vessel is discharged at room temperature through a coarse frit or filter cloth. This produces a white dispersion with a 20% solids content which has a viscosity $\eta$ 25° C. of 37 mPas and a long shelf-life.

EXAMPLE 8

A polyethylene terephthalate knit having a weight of 200 g per square meter is treated as follows in a Mathiesen lab jet.

An aqueous liquor at a ratio of 10:1 on weight of fibre is brought to about pH 5 with acetic acid.

4% on weight of fibre is added of the Example 1 aqueous dispersion of the polyetherester according to the invention. The temperature is then raised to 80° C., and the knitted fabric is treated at this temperature for 30 minutes.

0.5% on weight of fibre of C.I. Disperse Red 82 is then added.

The temperature is raised to 130° C. in the course of 30 minutes, and the treatment is continued at this temperature for 30 minutes.

The bath is then cooled down, and the fabric is rinsed, dehydrated by whizzing, dried at 120° C. for 2 minutes, and additionally heated at 160° C. for 2 minutes.

In contrast to textile material dyed only with C.I. Disperse Red 82, the knitted goods treated in accordance with the invention are appreciably hydrophilic, more than before, even after a number of washes. The hydrophilising effect is even significantly better than that produced by a copolyester which, according to German Offenlegungsschrift No. 212,993, is obtained by reacting spinnable polyethylene terephthalate with polyethylene glycol.

In the Examples which follow

I denotes untreated textile material which may have been dyed and/or brightened

II denotes treatment in accordance with the invention and

III denotes commercially available copolyester.

| Test of hydrophilicity by the DIN 53,924 height of wicking method | |
|---|---|
| unwashed textile material height of wicking after 5 minutes | after 10 machine washes at 60° C. height of wicking after 5 minutes |
| I   25 | 38 mm |
| II  138 | 126 mm |
| III 110 | 108 mm |

| Test of hydrophilicity by the DIN 53,924 height of wicking method | |
|---|---|
| unwashed textile material height of wicking after 5 minutes | after 10 machine washes at 60° C. height of wicking after 5 minutes |
| I   22 | 38 mm |
| II  143 | 136 mm |
| III 120 | 118 mm |

Textile material treated in accordance with the invention also has improved handle compared with a merely dyed textile or even compared with said commercially available copolyester.

The surface resistance of the knitted fabric treated in accordance with the invention is likewise considerably reduced compared with the comparisons:

I $1 \times 10^{13}$ ohm

II $2 \times 10^{9}$ ohm

III $5 \times 10^{10}$ ohm

The knitted fabric treated in accordance with the invention also has good soil-release and soil-redeposition properties and it has excellent easy-care properties.

The liquors made up using the aqueous dispersion of the polyetherester according to the invention are considerably more stable than those of said commercially available copolyester.

EXAMPLE 9

A polyethylene terephthalate fabric having a weight of 220 g per square meter is treated with an aqueous liquor which contains per liter 15 g of Fluorescent Brightener 199 and 65 g of the Example 1 aqueous dispersion of the polyetherester according to the invention. The textile material is dipped into the aqueous liquor and squeezed with sufficient pressure to give a 70% liquor pick-up.

The fabric is dried at 130° C. for 1 minute and is then additionally heated at 180° C. for 20 seconds.

In contrast to textile material treated only with Fluorescent Brightener 199, the fabric treated in accordance with the invention is very highly hydrophilic and remains so despite multiple washing.

This is not all, however, the textile material treated in accordance with the invention is also significantly more hydrophilic than the commercially available copolyester mentioned in Example 8.

The textile material treated in accordance with the invention also has an improved handle compared with a merely dyed textile or even compared with said commercially available copolyester.

The surface resistance of the knitted fabric treated in accordance with the invention is likewise considerably reduced compared with the comparisons:

I $1 \times 10^{13}$ ohm

II $2 \times 10^{9}$ ohm

III $5 \times 10^{10}$ ohm

The knitted fabric treated in accordance with the invention also has good soil-release and soil-redeposition properties.

The liquors made up using the aqueous dispersion of the polyetherester according to the invention are considerably more stable than those of said commercially available copolyester.

The textile material treated in accordance with the invention, moreover, has a very soft, supple handle compared with the fabric treated only with Fluorescent Brightener 199 or even compared with material treated with the abovementioned commercially available copolyester.

The textile material treated in accordance with the invention has particularly good easy-care properties compared with the abovementioned comparison.

For instance, on treatment with a soiling solution at a ratio of 50:1 at 60° C. for 15 minutes and subsequent rinsing with cold water, the textile material treated in accordance with the invention is unsoiled.

In contrast, the textile material which has not been treated in accordance with the invention but has merely been treated with Fluorescent Brightener 199 appears to be highly surface-soiled. The fabric treated with the commercially available copolyester appears to be slightly soiled.

The soiling solution contains per liter of water 2 g of carbon black dispersed with 0.5 g of a commercially available detergent.

The fabric treated in accordance with the invention similarly has superior soil-release properties than has textile material not treated with the polyetherester according to the invention or material treated with said commercially available copolyester. On application of the soiling solution which is specified in the next paragraph to the textile material complete soil release is obtained on machine-washing at 60° C. with a commercially available detergent if the textile material has been treated in accordance with the invention. The textile material not treated with the polyetherester according to the invention appears soiled after the wash. The textile material treated with the commercially available copolyester displays a low degree of soiling.

Soiling solution: 20 g of beef tallow, 30 g of mineral oil and 15 g of imitation street dust are dissolved in trichloroethylene, and the solution is dispersed and made up to a liter. The soil is applied by using a pipette to place 1 ml of soiling solution onto the textile.

A 12-hour soaking-in period is followed by the aforementioned wash in a domestic washing machine.

EXAMPLE 10

A polyethylene terephthalate knitted fabric having a weight of 200 g per square meter is treated with an aqueous liquor which contains per liter 50 g of the Example 2 aqueous 15% strength dispersion of the polyetherester according to the invention.

The knitted fabric is dipped into the aqueous liquor and squeezed under sufficient pressure to effect an 80% liquor pick-up. It is then dried at 120° C. for 2 minutes and additionally heated at 170° C. for 1 minute. Textile material treated in accordance with the invention is more hydrophilic than an untreated sample. This effect is resistant to repeated washing.

| Test of hydrophilicity by the DIN 53,924 height of wicking method | |
|---|---|
| unwashed textile material height of wicking after 5 minutes | after 10 machine washes at 60° C. height of wicking after 5 minutes |
| I 25 | 40 mm |
| II 139 | 131 mm |

The knitted material treated in accordance with the invention has a particularly satisfactory, smooth, supple handle compared with the untreated textile.

Moreover, the easy-care properties of the knitted material treated in accordance with the invention are excellent.

The surface resistance is $4 \times 10^9$ ohm, which is lower than the comparison's $1 \times 10^{13}$ ohm.

EXAMPLE 11

A polyethylene terephthalate knitted fabric having a weight of 200 g per square meter is HT-dyed at 130° C. with 4% Disperse Red 82 on weight of fibre.

The fabric is then given the conventional reduction-clearing treatment with sodium hydroxide solution and sodium dithionite.

After rinsing the fabric the final, warm rinse bath at 40° C. is brought to pH 4–5 with acetic acid. 4% on weight of fibre of the Example 3 aqueous 20% strength dispersion of the polyetherester according to the invention are then added. The temperature is raised to 90° C., and the fabric is treated at this temperature for 30 minutes. The bath is then cooled down, and the textile material is dewatered by whizzing. The textile material is then dried at 120° C. for 2 minutes and additionally heated at 160° C. for 2 minutes.

The textile material treated in accordance with the invention is much more hydrophilic than a sample dyed only with Disperse Red 82.

| Test of hydrophilicity by the DIN 53,924 height of wicking method | |
|---|---|
| unwashed textile material height of wicking after 5 minutes | after 10 machine washes at 60° C. height of wicking after 5 minutes |
| I 25 | 38 mm |
| II 115 | 110 mm |

Textile material treated in accordance with the invention has a satisfactory handle and good easy-care properties. The surface resistance is $2 \times 10^{10}$ ohm, which is lower than the comparison's $1 \times 10^{13}$ ohm.

EXAMPLE 12

A polyethylene terephthalate knitted fabric having a weight of 180 g per square meter is treated in a Mathiesen lab jet as follows.

An aqueous liquor at a ratio of 8:1 on weight of fibre is brought to about pH 5 with acetic acid. The warm liquor at 40° C. then has added to it 5% on weight of fibre of the Example 4 aqueous dispersion of the polyetherester according to the invention. Then is added 0.3% on weight of fibre of Disperse Red 82. The temperature is raised to 130° C. in the course of 40 minutes, and the fabric is treated at this temperature for 30 minutes.

The bath is cooled down, and the fabric is rinsed with water and dehydrated by whizzing.

It is then dried at 160° C. for 2 minutes.

The knitted fabric treated in accordance with the invention has a pleasant handle, good easy-care properties, and improved hydrophilicity.

| Test of hydrophilicity by the DIN 53,924 height of wicking method | |
|---|---|
| unwashed textile material height of wicking after 5 minutes | after 10 machine washes at 60° C. height of wicking after 5 minutes |
| I 28 | 40 mm |
| II 119 | 110 mm |

The surface resistance is $3 \times 10^{10}$, which is lower than the $1 \times 10^{13}$ of textile material not treated in accordance with the invention.

EXAMPLE 13

A polyethylene terephthalate fabric having a weight of 220 g per square meter is treated with an aqueous liquor which contains per liter 40 g of the Example 5 aqueous dispersion of the polyetherester according to the invention.

The fabric is dipped into the aqueous liquor and squeezed under sufficient pressure to effect an 80% liquor pick-up.

It is then dried at 120° C. for 2 minutes and additionally heated at 200° C. for 15 seconds.

The fabric treated in accordance with the invention has much improved hydrophilic properties which are resistant to repeated washing.

| Test of hydrophilicity by the DIN 53,924 height of wicking method | |
|---|---|
| unwashed textile material height of wicking after 5 minutes | after 10 machine washes height of wicking after 5 minutes |
| I 18 | 35 mm |
| II 128 | 120 mm |

The textile material treated in accordance with the invention has a particularly soft and elegant handle and good easy-care properties. The surface resistance is $2 \times 10^{10}$ ohm, which is less than the comparison's $1 \times 10^{13}$ ohm.

EXAMPLE 14

A polyethylene terephthalate knitted fabric having a weight of 200 g per square meter is treated with an aqueous liquor which contains per liter 4% on weight of fibre of the Example 6 aqueous dispersion of the polyetherester according to the invention. The liquor also contains 1% of Disperse Red 82 and 4% of a commercially available carrier, the percentages being on weight of fibre. The liquor ratio is 20:1.

The temperature of the aqueous liquor is raised from 40° C. to 100° C. in the course of 40 minutes. The fabric is then treated at this temperature for 60 minutes. It is rinsed with water and dehydrated by squeezing. The fabric is then dried at 120° C. for 2 minutes and additionally heated at 160° C. for 2 minutes.

The textile material treated in accordance with the invention has much improved hydrophilic properties which are resistant to repeated washing.

| Test of hydrophilicity by the DIN 53,924 height of wicking method | |
|---|---|
| unwashed textile material height of wicking after 5 minutes | after 10 machine washes at 60° C. height of wicking after 5 minutes |
| I  25 | 38 mm |
| II  132 | 130 mm |

The textile material treated in accordance with the invention has a pleasant handle and good easy-care properties. The surface resistance is $3 \times 10^{10}$ ohm, which is less than the comparison's $1 \times 10^{13}$ ohm

EXAMPLE 15

A polyethylene terephthalate knitted fabric having a weight of 200 g per square meter is treated with an aqueous liquor which contains per liter 45 g of the Example 7 aqueous dispersion of the polyetherester according to the invention. The knitted fabric is dipped into the aqueous liquor and squeezed under sufficient pressure to effect an 80% liquor pick-up. It is then dried at 170° C. for 2 minutes.

The knitted fabric treated in accordance with the invention has a pleasant handle, easy-care properties and improved hydrophilicity.

| Test of hydrophilicity by the DIN 53,924 height of wicking method | |
|---|---|
| unwashed textile material height of wicking after 5 minutes | after 10 machine washes at 60° C. height of wicking after 5 minutes |
| I  25 | 38 mm |
| II  132 | 125 mm |

The textile material treated in accordance with the invention has a surface resistance of $5 \times 10^{10}$ ohm, which is less than the comparison's $1 \times 10^{13}$ ohm.

EXAMPLE 16

A fabric consisting of 50% polyethylene terephthalate and 50% cotton and having a weight of 150 g per square meter is treated with an aqueous liquor which contains per liter 50 g of the Example 1 aqueous dispersion of the polyetherester according to the invention. The fabric is dipped into the liquor and squeezed under sufficient pressure to effect a 90% liquor pick-up. It is then dried at 130° C. for 2 minutes and additionally heated at 160° C. for 2 minutes.

The fabric treated in accordance with the invention has a pleasant handle, good easy-care properties and improved hydrophilicity.

| Test of hydrophilicity by the DIN 53,924 height of wicking method | |
|---|---|
| unwashed textile material height of wicking after 5 minutes | after 5 machine washes at 60° C. height of wicking after 5 minutes |
| I  55 | 81 mm |
| II  122 | 118 mm |

The surface resistance of the fabric treated in accordance with the invention is $2 \times 10^7$ ohm, which is less than the comparison's $3 \times 10^{10}$ ohm.

EXAMPLE 17

A fabric consisting of 70% wool and 30% polyethylene terephthalate and having a weight of 250 g per square meter is treated with an aqueous liquor which contains per liter 60 g of the Example 2 aqueous dispersion of the polyetherester according to the invention.

The fabric treated in accordance with the invention has a pleasant, soft handle, good easy-care properties and improved hydrophilicity.

| Test of hydrophilicity by the DIN 53,924 height of wicking method | |
|---|---|
| | height of wicking after 5 minutes |
| I | 5 mm |
| II | 95 mm |

The surface resistance of the fabric treated in accordance with the invention is $2 \times 10^9$ ohm, which is less than the comparison's $1 \times 10^{10}$ ohm.

EXAMPLE 18

A nylon fabric weighing 160 g per square meter is treated with an aqueous liquor which contains per liter 40 g of the Example 1 aqueous dispersion of the polyetherester according to the invention.

The fabric is dipped into the aqueous liquor and squeezed under sufficient pressure to effect a 70% liquor pick-up. The fabric is then dried at 170° C. for 2 minutes.

The nylon fabric treated in accordance with the invention has improved hydrophilicity and good easy-care properties.

| Test of hydrophilicity by the DIN 53,924 weight of wicking method | |
|---|---|
| unwashed fabric height of wicking after 5 minutes | after 3 machine washes at 60° C. height of wicking after 5 minutes |
| I  20 | 25 mm |
| II  85 | 80 mm |

The surface resistance of the fabric treated in accordance with the invention is $3 \times 10^9$ ohm, which is less than the comparison's $2 \times 10^{12}$ ohm.

EXAMPLE 19

A fabric consisting of 50% polyethylene terephthalate and 50% cotton and weighing 150 g per square meter is treated with an aqueous liquor which contains per liter 60 g of the Example 1 aqueous dispersion of the polyetherester according to the invention, 50 g of dimethyloldihydroxyethylene urea, and 20 g of magnesium chloride hexahydrate.

The fabric is dipped into the liquor and squeezed under sufficient pressure to effect an 80% liquor pick-up.

It is then dried at 120° C. for 2 minutes and additionally heated at 160° C. for 4 minutes.

Unlike textile material treated only with dimethyloldihydroxyethylene urea and magnesium chloride hexahydrate, the fabric treated in accordance with the invention has improved hydrophilicity and good easy-care properties.

| Test of hydrophilicity by the DIN 53,924 height of wicking method | |
|---|---|
| unwashed textile material height of wicking after 5 minutes | after 5 machine washes at 60° C. height of wicking after 5 minutes |
| I    5 | 8 mm |
| II   95 | 90 mm |

| Creasing Dry crease recovery angle as defined in DIN 53,890 | |
|---|---|
| unwashed textile material | after 5 machine washes at 60° C. |
| I    145° | 141° |
| II   146° | 143° |

It is plain that the treatment according to the invention does not increase creasing.

EXAMPLE 20

A fabric consisting of 70% wool and 30% polyethylene terephthalate and weighing 250 g per square meter is treated with an aqueous liquor which contains per liter 70 g of the Example 1 aqueous dispersion of the polyetherester according to the invention, 10 g of an aqueous commercially available 50% strength solution of a bisulphite-blocked isocyanate prepolymer, 10 g of a commercially available 40% strength aqueous anionic polyester-polyurethane dispersion, and 3 g of sodium hydrogencarbonate. The textile material is dipped into the aqueous liquor and squeezed under sufficient pressure to effect a 90% liquor pick-up.

The fabric is then dried at 140° C. for 3 minutes and is treated with steam under 6 bar for 1 minute.

The textile material treated in accordance with the invention, compared with material treated without addition of the polyetherester according to the invention, has improved hydrophilic properties and good easy-care properties.

| Test of hydrophilicity by the DIN 53,924 height of wicking method | |
|---|---|
| unwashed textile material height of wicking after 5 minutes | after 3 machine washes at 40° C. height of wicking after 5 minutes |
| I    5 | 8 mm |
| II   81 | 80 mm |

The action of the bisulphite-blocked isocyanate prepolymer in conferring non-felting properties on the keratin-containing fibre portion is not impaired, as is shown by the following table:

| Felting shrinkage after 3 machine washes at 40° C. | | |
|---|---|---|
| | Warp | |
| I  | 1.5 | 0.8% |
| II | 1.4 | 0.8% |

We claim:

1. Water-soluble or water-dispersible segmented polyetheresters having a predominantly linear molecular structure and containing
(a) 3–45% by weight of terephthalate groups of the formula

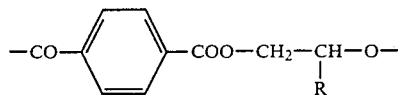

wherein
R denotes hydrogen or methyl,
(b) 0.4–6% by weight of terephthalate groups of the formula

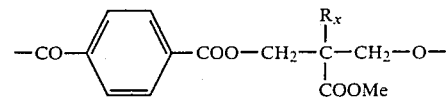

wherein
$R_x$ denotes hydrogen or $C_1$–$C_4$-alkyl and
Me denotes an alkali metal or ammonium ion, and
(c) 49–96.6% by weight of terminal polyalkylene glycol groups, all the weights being relative to that of the polyetherester.

2. Polyetheresters according to claim 1, characterised in that their average molecular weight is between 500 and 11,000.

3. Polyetheresters according to claim 1, characterised in that
$R_x$ represents hydrogen or $C_1$–$C_4$-alkyl,
Me represents Li, Na, K or

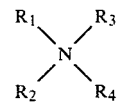

and
$R_1$, $R_2$, $R_3$ and $R_4$ each represent hydrogen or $C_1$–$C_{20}$-alkyl which can be substituted by OH or $NH_2$,
and that component (c) is an ethylene or propylene glycol ether or a mixed ethylene/propylene glycol ether of the formula

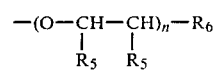

wherein
$R_5$ represents hydrogen and/or methyl,
$R_6$ represents $C_1$–$C_{20}$-alkoxy or di-$C_1$–$C_{20}$-alkylamino and
n represents 10–220, preferably 15–120.

4. Polyetheresters according to claim 1, characterised in that they contain 10–20% by weight of (a), 1–3% by weight of (b), and 70–89% by weight of (c), and that component (c) is a polyethylene glycol monoalkyl ether or a mixed polyethylene/propylene glycol monoalkyl ether.

5. Process for preparing polyetheresters of claim 1, characterised in that dimethyl terephthalate is reacted with ethylene glycol and salts of acids of the formula

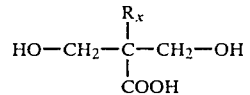

where
 $R_x$ = hydrogen or $C_1$–$C_4$-alkyl,
to prepare prepolymers, which are then reacted with monofunctional polyalkylene glycols having a hydroxyl group.

6. Process for finishing textile materials made of synthetic fibres and their mixtures with cellulosic fibres or keratin-containing fibres, characterised in that the fibres are treated with polyetheresters of claim 1.

7. Process according to claim 6, characterised in that the synthetic fibres are polyester fibres.

8. Process according to claim 6, characterised in that the treatment is from an aqueous liquor using the exhaust, padding or spraying method.

* * * * *